United States Patent [19]
Fuller

[11] Patent Number: 5,311,916
[45] Date of Patent: May 17, 1994

[54] WHEEL RIM WELL SAFETY DEVICE

[75] Inventor: Richard L. Fuller, Massillon, Ohio

[73] Assignee: Standards Testing Laboratories, Inc., Massillon, Ohio

[21] Appl. No.: 827,748

[22] Filed: Jan. 29, 1992

[51] Int. Cl.$^5$ .............................................. B60B 25/00
[52] U.S. Cl. ............................... 152/381.6; 152/379.3; 152/381.3
[58] Field of Search .................... 152/375, 381.6, 381.5, 152/399, 400, 379.3, 379.4, 379.5, 381.3, 381.4, 401

[56] References Cited

U.S. PATENT DOCUMENTS

| | | |
|---|---|---|
| 1,771,363 | 7/1930 | Wagenhorst . |
| 1,820,857 | 8/1931 | Wilson . |
| 2,128,322 | 8/1938 | Riehl . |
| 4,040,465 | 8/1977 | Mitchell ...................... 152/381.6 X |
| 4,165,776 | 8/1979 | Marvy . |
| 4,258,771 | 3/1981 | Snyder . |
| 4,304,282 | 12/1981 | Watts . |
| 4,305,622 | 12/1981 | Mitchell . |
| 4,374,535 | 2/1983 | Watts . |
| 5,018,565 | 5/1991 | Frerichs et al. . |

FOREIGN PATENT DOCUMENTS

| | | | |
|---|---|---|---|
| 14236 | of 1928 | Australia ........................... | 152/381.6 |
| 105133 | 7/1926 | Austria .............................. | 152/381.6 |
| 722953 | 3/1932 | France .............................. | 152/381.6 |
| 209440 | 1/1924 | United Kingdom ............. | 152/381.6 |
| 628237 | 8/1949 | United Kingdom ............. | 152/381.6 |

*Primary Examiner*—Russell D. Stormer
*Attorney, Agent, or Firm*—Stevens, Davis, Miller & Mosher

[57] ABSTRACT

An annular filler mountable in the well of a one piece car or truck wheel rim for increasing the diameter of the well to a point where that bead seating diameter generally corresponds to the diameter of the tire size which is intended to be mounted on that wheel. Thus when a tire is mounted by placing one portion of its bead into the well while the diametric opposite portion of the tire bead is forced over the rim flange, only a tire having a correct bead seating diameter will be able to pass over the wheel flange and a tire with an incorrect bead seating diameter cannot pass over said flange.

12 Claims, 4 Drawing Sheets

WHEEL RIM WELL SAFETY DEVICE

BACKGROUND OF THE INVENTION

This invention relates to pneumatic vehicle tires and wheel rim assemblies and in particular insuring greater vehicle safety by a method and device for preventing the mounting of a tire on a wheel rim of a size and type that is not intended to receive that tire. Each tire of a particular size and type is designed to be mounted upon a particular size wheel rim. The variables in tire to wheel rim fitment include rim bead seating diameter verses tire bead diameter; axial design width (distance between the two beads) of the tire verses axial width of the wheel rim and the bead seating angle. All of these variables must be compatible to have a proper fitment of the tire on the wheel rim.

The presently popular pneumatic vehicle tire is well known, it has a toroidal shaped elastomer carcass with at least one carcass reinforcing ply embedded therein and a tread band on its outer ground contacting surface. The radial inner ends of the carcass ply are turned up around a pair of bead wires or bead bundles, which are usually made of a plurality of steel wires. The bead bundle is normally of planar circular configuration but it can be forcedly distorted into an oval and into a nonplanar shape for the purpose of mounting on a one piece steel wheel rim. In ordinary use the bead bundle is considered to be "inextensible" but this is of course a relative term and if subjected to too much stress, the bead bundle can stretch or break.

The wheel rim, when viewed in cross section along a radial plane extending parallel to the axis of rotation of the tire, has a pair of radially outwardly extending flanges on the axially outer sides of the wheel rim and axially inward from each flange is a bead seating surface and central portion of smaller diameter in the form of a drop center portion or well. This well has a diameter smaller than the bead seating surface diameter so that when a tire bead is forcedly distorted so as to pass over the wheel rim flanges, the portion of the tire bead passed over the flanges can then be dropped into the well so that the diametrically opposite portion of the tire bead can then also be forced over the wheel rim flange. Thus the entire circumference of both tire beads may be passed over the flanges, step by step working around the bead circumference, until both beads are in the well. In modern day passenger car and light truck tires there is usually no inner tube in the tire but instead a tire inflation valve is mounted in an aperture in the wheel rim. Heavy truck and bus tires may have an inner tube although the trend is toward tubeless tires. If there is a tube the inflation valve is of course part of the tube. Upon pressurizing the inside of the tire, by use of the tire valve, the tire beads will be forced axially outward so as to seat, with an interference fit, snugly upon the wheel rim bead seating surfaces and pressed axially outward against the rim flanges.

The radial inward end of the bead is an annular surface which, when properly seated on the rim bead seating surface, lies at an angle to the axial direction; in passenger car tires this angle is 5°; in tubeless truck and bus tires it is 15°. However in light truck tires both 5° and 15° seating angles exist; this is part of the problem of mismatched mounting of tires and wheels.

When the tire beads are properly seated on a wheel rim for which they are designed to be mounted the bead core wires will be stretched tight and due to the taper of the bead seating surface, the surrounding relatively hard rubber, the inflation pressure and compression of rubber and fabric under the bead, the bead will stay firmly in place when the tire is subjected to strong sideway forces during turning, accident avoidance maneuvers, acceleration and deceleration of the vehicle, thus enabling the driver to get and keep the vehicle under proper control.

When the tire beads are not properly mounted, especially when a tire is placed upon a wheel rim for which it was not intended, e.g. a tire bead diameter of 16 inches on a bead seating surface of 16.5 inches, disastrous results can follow. This includes: breaking of the bead core wires so that the tire blows off the rim when inflated; breaking, kinking or displacement of some of the wires of the bead bundle so as to make the tire susceptible to early failure; stretching of the bead bundle so as to lead to an improper fit that will impair the tire's structural integrity.

The sideway force on a tire tends to exert a force on the bead of that tire tending to cause the bead bundle to rotate about its own longitudinal axis with the hard rubber filler strip that is radially outward of the bead bundle acting as a lever arm to cause the bead to rotate about the bead bundle on the rim bead seating surface. If the bead does succeed in rotating, the bead will usually become of a different effective circumference, upsetting the tension on the reinforcing bead bundle wires, and permitting at least one of the tire beads to unseat, that is to move axially inwardly toward the center of the rim and into the well. If this happens, the driver's control very likely will be lost.

In the prior art in passenger car tires the possibility of mounting the wrong size tire on a wheel rim had been largely avoided by making a distinct difference in sizes; e.g. maintaining at least a whole inch diameter difference between sizes. Thus popular tire bead diameter sizes have in the past been 13 inch, 14 inch, 15 inch, 16 inch, 17 inch, etc. with a 5° taper but not any 13½, 14½, 15½ or 16½ inch sizes or 15° tapers in passenger car tires. Maintaining at least a whole inch difference between size can prevent tire rim mis-mountings; for example, it is virtually impossible to get a 13 inch tire over the rim flanges of a 14 wheel and if one could do so, upon attempt to inflate the tire to seat the flanges, the 13 inch tire bead diameter will simply not fit onto the bead seating surface of a 14 inch wheel rim. This lack of fit is caused by two factors: the difference in diameter and the fact both the wheel rim and the tire are 5° tapers which is relatively "flat" with little opportunity for an improper size to even get started on the bead seating surface even when considerable air pressure for mounting is applied.

Experience has shown that a 16 inch 5° tire can be introduced onto a 16.5 inch 15° wheel rim and that such an introduction will not result in a proper mounting even if it might appear visually to be correct. Unfortunately the relative diameters and the 15° seating surface on the wheel rim will lead to a situation where the inflation pressure (especially high inflation pressure) will cause a seal (albeit an improper seal) between the tire beads and the rim that is usually sufficient for the tire to inflate and thus potentially misleading the tire installer to believe that the tire is a proper fit on the wheel rim when such is not in fact the case. In such a mounting the tire beads are not properly engaged with the rim so that the entire radially inwardly facing annular surface of the tire bead is no likely to be in full intended contact with the wheel rim bead seating surface, thus setting up a situation for latent failure (i.e. bead breakage or other bead area damage).

SUMMARY OF THE INVENTION

An object of the present invention is a method of modifying a wheel rim so as to prevent the introduction to the wheel rim of a tire having a bead diameter that is not intended for it. Another object of the present invention is to provide a means for modifying a wheel rim so as to prevent an unintended (e.g. too small) bead diameter tire from being introduced onto the wheel rim.

The method of the invention comprises ascertaining the diameter of the well of the wheel rim, comparing that diameter to the bead diameter of a tire that is proper for that wheel rim so as to obtain a first measurement; comparing the wheel well diameter to the diameter of a tire that should not be mounted on the wheel rim to obtain a second measurement; filling in the well to a diameter that is greater than said second measurement and slightly less than said first measurement.

The means for modifying a wheel rim to prevent the introduction of a tire having an unintended bead diameter (e.g. one which is too small to mount properly on the wheel rim) comprises an elongated strip of elastomer having a width sufficient to fit within the well and a length sufficient to stretch around substantially the entire circumference of the well; in a preferred embodiment the strip would be in the form of a stretchable and elastic endless belt or collar having a normal (unstretched) diameter slightly smaller than the wheel well diameter and a radial thickness to fill in the well to limit its depth to a point where there is insufficient depth for the beads of an improper (e.g. tire too small a diameter) from being introduced onto the wheel rim.

DETAILED DESCRIPTION OF A PREFERRED EMBODIMENT

Figure 1:
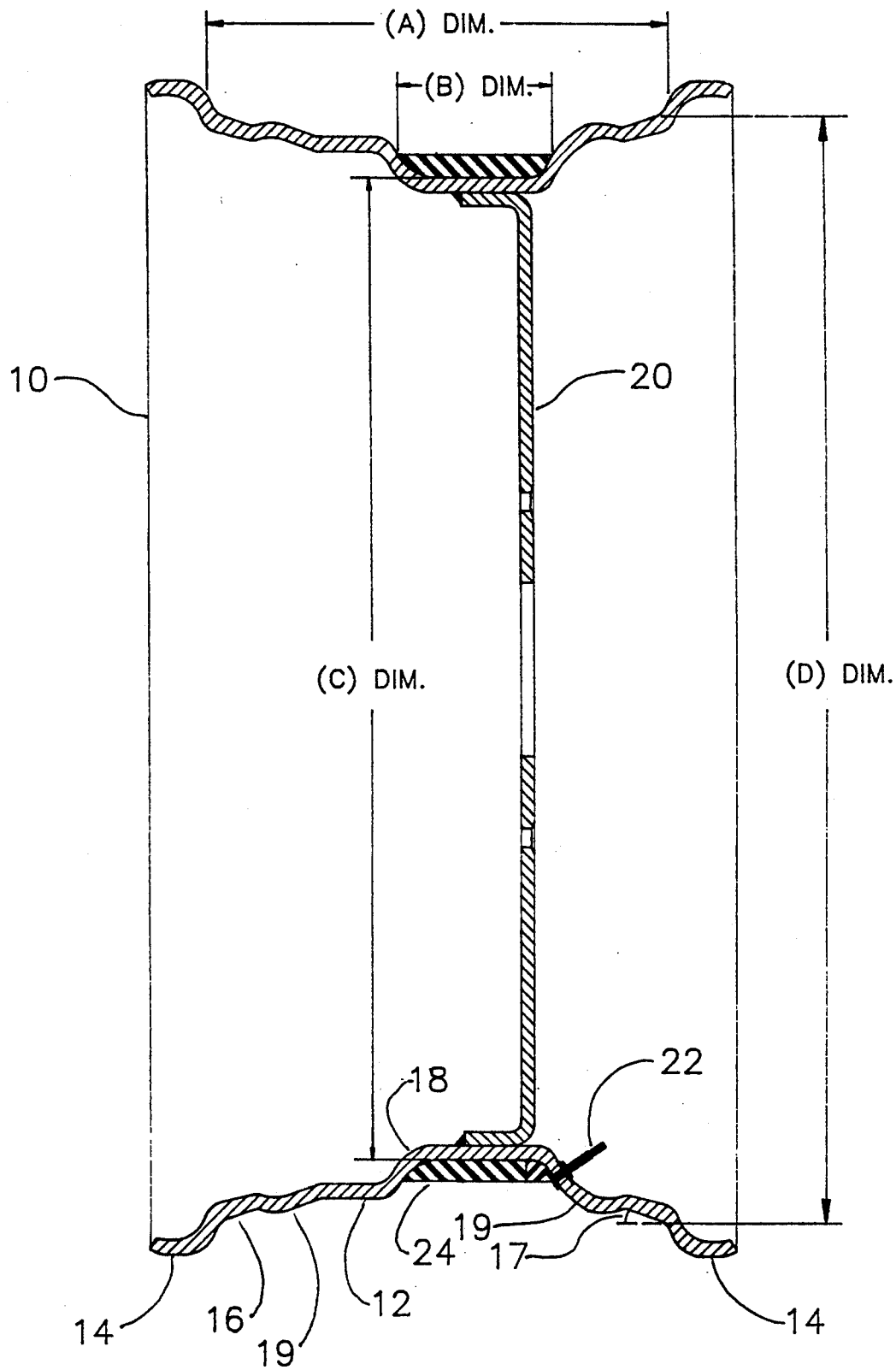
FIG. 1 is an axial sectional view of a wheel rim with a center well in which there is positioned a well filler according to the present invention.

FIG. 1 shows, in diametric cross section taken parallel to the axis of rotation, a view of a vehicle wheel 10 having a one piece wheel rim 12 and a central wheel web or disk 20. The rim 12 has on its axial ends a pair of wheel flanges 14 which extend axially and radially outwardly. Inboard of the flanges 14 are a pair of wheel rim bead seating surfaces 16 and in the central region of the rim is a drop center portion or well 18. Numeral 19 designates a pair of tire bead retaining humps. A tire valve 22 for admission of inflation air into a tire is positioned in an aperture in the rim at a position adjacent to or partly into the well 18.

In FIG. 1 dimension A is the axial width of the bead seating surface, dimension B is the nominal axial width of the wheel well, usually 1¼" to 2¼", dimension C is the diameter of the well and dimension D is the diameter of the wheel at the bead seating surface; dimension D is also known as the nominal wheel diameter.

For the sake of illustration by way of example and not by way of limitation, in the 16.5 inch wheel (dimension D) the well diameter is approximately 14.50 to 14.66" (dimension C) and the bead seating surface angle 17 is 15° with respect to the axis of rotation, line 15 being parallel to that axis.

Figure 2:
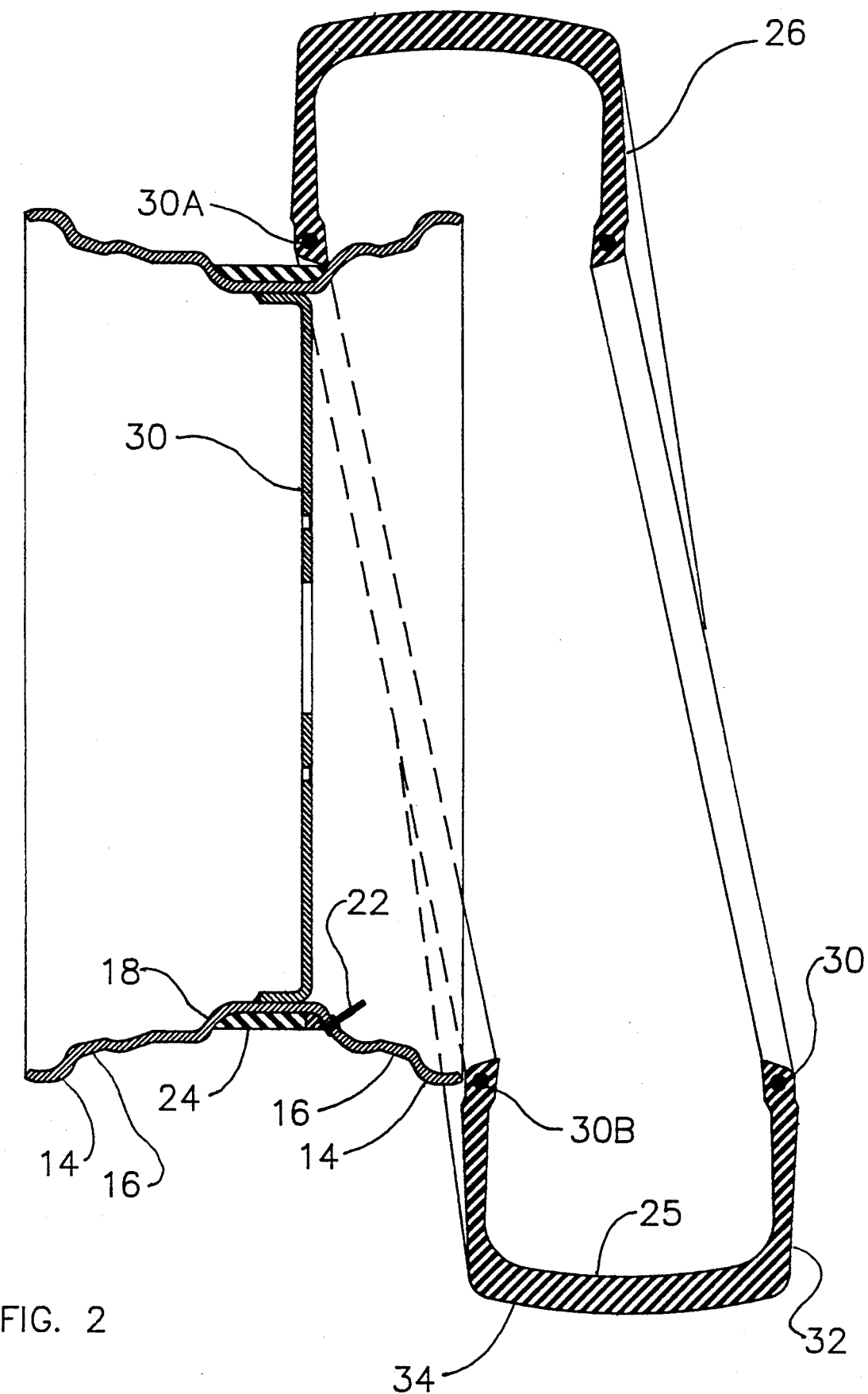
FIG. 2 is an axial sectional view of the wheel rim of FIG. 1 showing a tire in the process of being mounted thereon.
Figure 5:
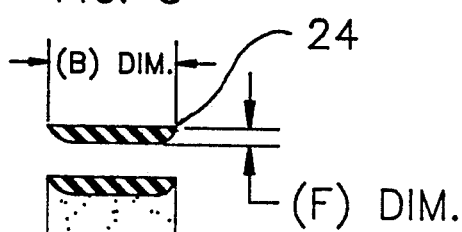
FIG. 5 is an axial sectional view showing the well filler of FIG. 3 in cross section.

A tire 26 is mounted on wheel rim 12 by forcing one bead 30A over the flanges 14 so that bead 30A is positioned in well 18. Ordinarily if the correct size tire were attempted to be mounted the well would only be deep enough so that the bead 30A could drop into the well a sufficient distance so that circumferentially opposite bead 30B could be slipped over flange 14. However, in the case illustrated in FIG. 2 the tire 26 is of a size not intended for mounting on that wheel, say it is a 16 inch passenger car or light truck tire intended for a 5° bead seating surface but the wheel rim is as described in the previous example, that is a 16.5 inch rim with a 15° bead seating surface. It would be possible to improperly mount that 16 inch tire on the 16.5 inch wheel if it were not for the presence of bead filler 24 of the present invention; this filler is shown in greater detail in FIGS. 3-5. It is of circular configuration, preferably an endless stretchable and elastic belt of plastic, rubber or other material having a hardness of about Shore A 30 or greater. If it is made of rubber (or rubber-like elastomer material) then it would have an internal diameter (dimension E in FIG. 4) in the relaxed state of less than the dimension C of the well e.g. approximately 14" for a 14.5 well diameter. In a cross section through the thickness of the well filler 24 as shown in FIG. 5 the rubber is preferably of trapezoid cross section having a major base (dimension B) approximately equal to the width of the well and a minor base to fit into the bottom of the well. The filler had a radial thickness (dimension F) of approximately 0.30" inches in this particular example. In connection with other size of tires or wheel rims of different well diameters, the thickness varies depending upon the bead diameter of the tire that is to be mounted compared with the well diameter and the bead diameter of the tire to be excluded as compared with the well diameter. The object is to add enough diameter to the wheel well so that the tire to be excluded cannot be fitted, as shown in FIG. 2 but to have enough available diameter so that the proper tire can be slipped over wheel flange. In a 16.5 inch wheel, the well diameter is preferably brought up to 15.10 inches, that is 14.50"+0.30"+0.30"=15.10".

Figure 3:
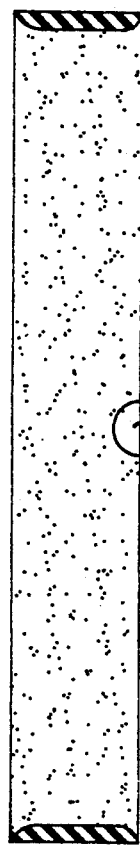
FIG. 3 is an elevational view of the well filler of the invention.
Figure 4:
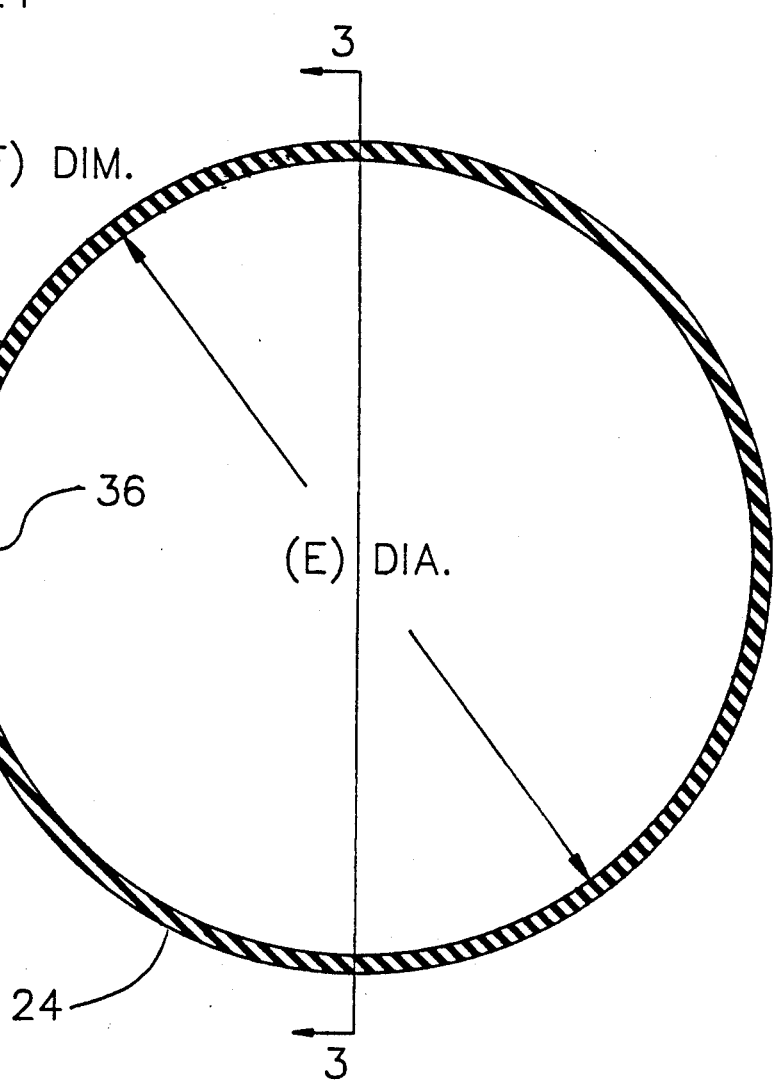
FIG. 4 is a side view of the filler of FIG. 3.

When viewed in elevation in FIG. 3 the subject well filler 24 is shown as including a cutout notch 36 to accommodate tire valve 22, see FIG. 2.

Figure 6:
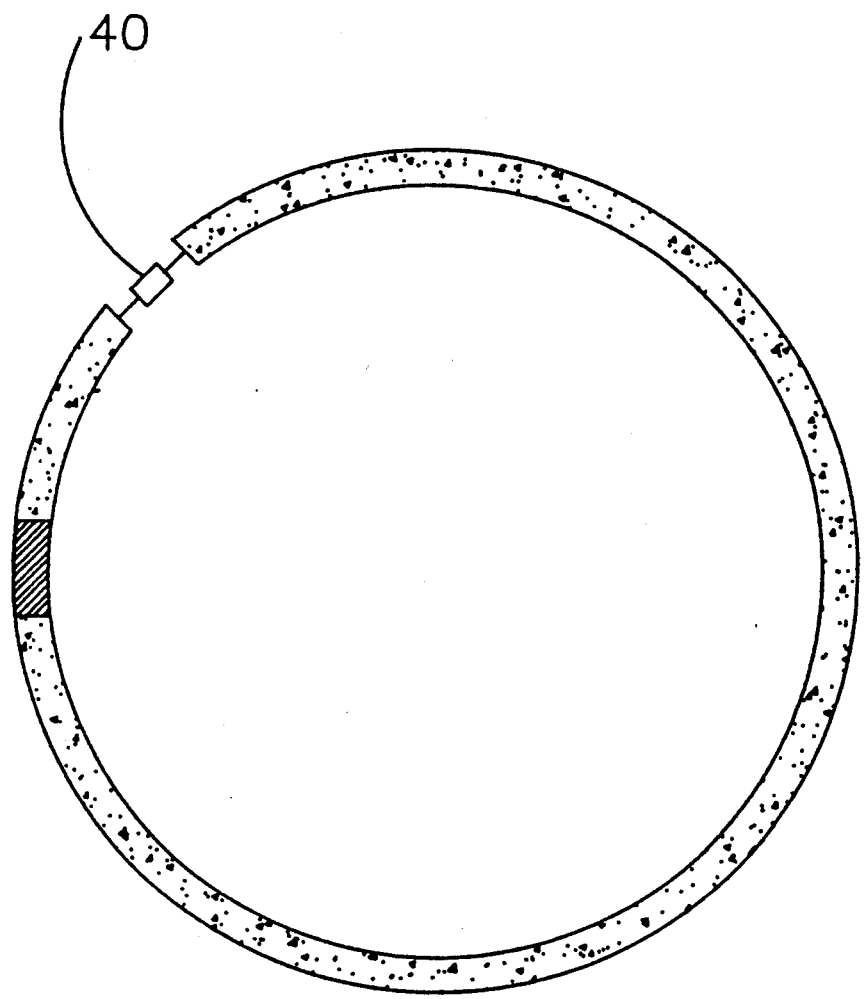
FIG. 6 is a side view similar to FIG. 4 but showing the well filler as an elongated body bent in the shape of a circle with an opening to enable it to be fitted around a wheel rim and a coupling means for holding the well filler in a closed position.

The well filler may be held in place by residual hoop tension of approximately 15 pounds or it may be held in place by suitable adhesives such as rubber cement or spray contact cement or the like. It also contemplates that the filler 24 may not be an endless belt if it were made of a relatively hard plastic material. It would then instead be an annular body that could be opened up either by means of a hinge joint or due to being made in two or more pieces that would interfit by coupling means 40 as shown diagrammatically in FIG. 6, or by adhesive to the well inner surface. It is also contemplated that the well further could be made of a self adhesive, pliant high density foam or other similar materials.

This invention is ideally adapted for retrofitting of existing wheel rims, preferably when the tire is completely dismounted. However, it is possible to retrofit even without the necessity of completely dismounting the tire from the wheel rim. If the tire is deflated and one tire bead is forced over a wheel flange, then the tire can be moved axially off to one side similar to but not as far as the tire shown in FIG. 2. After the tire is moved to one side the well will be exposed so that the device of the present invention can be installed from the opposite axial side of the wheel rim.

I claim:

1. In a tire and wheel rim combination wherein said wheel rim has, when viewed in axial cross section, a pair of rim bead seating surfaces for receiving beads of the tire; a pair of radially outwardly extending wheel rim flanges at the axial outer ends of the rim bead seating surfaces for limiting axial outward movement of the tire beads; a well portion located in the axial central portion of said rim cross section, said well portion being of a smaller diameter than the diameter of said rim bead seating surfaces;

said tire having a carcass with a pair of tire beads, each bead having a circular bead seat of a carefully selected diameter to correspond with said rim bead seating surfaces such that, when mounted, the tire bead seats will snugly fit on the rim bead seating surfaces so as to mount the tire securely on said rim, wherein the improvement comprises:

means to prevent the incorrect mounting of a tire of an improper bead seating diameter which is smaller than said carefully selected diameter, said means comprising a substantially annular filler means mountable in said well portion for increasing the diameter thereof to a point where that diameter generally corresponds to the diameter of said carefully selected diameter so that when a tire is mounted by placing one portion of its bead into said well while the diametric opposite portion of said tire bead is forced over the rim flange, only a tire having a correct bead seating diameter of at least said carefully selected diameter will be able to pass over said flange and a tire with a bead seating diameter of less than said carefully selected diameter cannot pass over said flange.

2. The improvement of claim 1 wherein said filler means is an endless band of elastomeric material which is stretchable and elastic to a sufficient degree to permit it to be stretched over said wheel rim flange for placement and fitting within said well portion so as to increase the diameter of said well portion.

3. The improvement of claim 2 wherein the wheel rim has a tire inflation valve aperture and the annular filler has a notch positioned to correspond to said aperture.

4. The improvement of claim 2 wherein the endless band is made of an elastomeric material having a hardness of shore A 30 or greater.

5. The improvement of claim 2 wherein the well filler has a radial thickness of approximately 0.30 inches.

6. The improvement of claim 1 wherein the well filler has a trapezoidal cross section.

7. The improvement of claim 1 wherein said filler means is a high density foam material.

8. A method for preventing the mounting of a tire having a bead seat diameter that is not intended for mounting on a bead seating surface of a one piece wheel rim having a central well, said method comprising:

ascertaining the diameter of the well of said wheel rim;

ascertaining the bead seat diameter of a first tire that is proper for mounting on said wheel rim;

comparing the well diameter to the bead seat diameter of said first tire so as to obtain a first measurement;

ascertaining the bead seating diameter of a second tire that should not be mounted on the wheel rim;

comparing the well diameter to the bead seat diameter of said second tire to obtain a second measurement;

inserting a filler into said wheel to fill the well to a diameter that is greater than said second measure but slightly less than said first measurement.

9. A method for preventing the mounting of an improper tire having a bead seat diameter which is smaller than the bead seat diameter of a proper tire which is intended for mounting on a bead seating surface of a one piece wheel rim having a central well, said method comprising prior to attempting to mount a tire, inserting a filler into said well to fill the well to a diameter to increase said diameter to a point where that diameter generally corresponds to the bead diameter of said proper tire so that when a tire is mounted by placing one portion of its bead into said well while the diametric opposite portion of said tire bead is forced over the rim flange, only said proper tire will be able to pass over said flange and an improper tire with a bead seating diameter of less than said proper tire cannot pass over said flange.

10. The method of claim 9 wherein the wheel rim is intended to receive a tire with a 16.5" bead diameter, the improper tire has a 16" bead diameter and the well is filled to a diameter of about 15.10 inches.

11. The improvement of claim 1 wherein the well filler is imprinted on at least one of its surfaces with instructions relative to rim size utilization.

12. The improvement of claim 1 wherein said filler means is an elongate body with two ends and a coupling means on said ends for closing said body into an annulus after it is placed within said well.

* * * * *